United States Patent [19]

Cowan et al.

[11] Patent Number: 5,307,876
[45] Date of Patent: May 3, 1994

[54] METHOD TO CEMENT A WELLBORE IN THE PRESENCE OF CARBON DIOXIDE

[75] Inventors: Kenneth M. Cowan, Sugar Land; James J. W. Nahm; Arthur H. Hale, both of Houston, all of Tex.

[73] Assignee: Shell Oil Company, Houston, Tex.

[21] Appl. No.: 964,974

[22] Filed: Oct. 22, 1992

[51] Int. Cl.$^5$ .................. E21B 33/13; E21B 41/02
[52] U.S. Cl. .................. 166/293; 166/292; 166/402; 106/790
[58] Field of Search ............ 166/292, 293, 281, 902; 175/64, 65; 106/789, 790; 507/140

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |

(List continued on next page.)

FOREIGN PATENT DOCUMENTS 85-144069/24 7/1983 Japan .
61-48454 3/1986 Japan .
883704 6/1981 U.S.S.R. .

OTHER PUBLICATIONS

"Deep Cement Mixing Experience in Japan", by G. Dennis et al., Copyright 1985 Seabed Strengthening Symposium, Denver, Colo., Jun. 4, 1985, TP 85-5.

"Mud Disposal: An Industry Perspective", Hanson et al., Drilling, May 1986, pp. 16-21.

"Waste Minimization Program Can Reduce Drilling Costs", Hall et al., Oryx Energy Co., Houston, Tex., Oil & Gas Journal, Jul. 1, 1991, pp. 43-46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575, (Oct. 4, 1992), by Cowan et al.

"Quantitative Interpretation of X-Ray Diffraction Patterns of Mixtures. I. Matrix-Flushing Method for Quantitative Multicomponent Analysis", by Frank H. Chung, J. Appl. Cryst., (1974), 7, pp. 519-525.

*Primary Examiner*—George A. Suchfield

[57] ABSTRACT

The present invention is a method to cement a wellbore in the presence of carbon dioxide, or when the wellbore will subsequently be exposed to carbon dioxide. The wellbore is cemented using a blast furnace slag cement slurry, and the resulting set cement is considerably less susceptible to degradation by carbon dioxide.

18 Claims, No Drawings

U.S. PATENT DOCUMENTS

| | | |
|---|---|---|
| 4,460,292 | 7/1984 | Durham et al. . |
| 4,518,508 | 5/1985 | Conner .................................. 210/751 |
| 4,635,724 | 1/1987 | Bruckdorfer et al. .......... 166/292 X |
| 4,643,617 | 2/1987 | Kanno et al. ......................... 405/222 |
| 4,664,843 | 5/1987 | Burba, III et al. . |
| 4,674,574 | 6/1987 | Savoly et al. ....................... 166/293 |
| 4,688,128 | 5/1987 | Hartley et al. . |
| 4,690,589 | 9/1987 | Owa .................................... 405/263 |
| 4,692,065 | 9/1987 | Suzuki et al. ....................... 405/211 |
| 4,720,214 | 1/1988 | Brasted et al. . |
| 4,746,245 | 5/1988 | Mork .................................... 405/224 |
| 4,760,882 | 8/1988 | Novak . |
| 4,761,183 | 8/1988 | Clarke . |
| 4,790,954 | 12/1988 | Burba, III et al. . |
| 4,842,056 | 6/1989 | Van Laar ............................. 166/292 |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,020,598 | 6/1991 | Cowan et al. ....................... 166/293 |
| 5,026,215 | 6/1991 | Clarke . |
| 5,058,679 | 10/1991 | Hale et al. . |
| 5,082,499 | 1/1992 | Shen .................................... 106/735 |
| 5,086,850 | 2/1992 | Harris et al. . |
| 5,105,885 | 4/1992 | Bray et al. . |
| 5,106,423 | 4/1992 | Clarke . |
| 5,106,711 | 5/1992 | Cowan . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ................... 106/811 |
| 5,147,565 | 9/1992 | Bour et al. ......................... 252/8.551 |

…

METHOD TO CEMENT A WELLBORE IN THE PRESENCE OF CARBON DIOXIDE

FIELD OF THE INVENTION

This invention relates to a method to cement a wellbore in the presence of carbon dioxide and to a method to provide a wellbore for service in the presence of carbon dioxide.

BACKGROUND OF THE INVENTION

Carbon dioxide is a commonly occurring component of gas and oil streams. Carbon dioxide is also used in secondary oil recovery as a miscible flood component. Wellbores and wells must therefore be provided that can tolerate the presence of carbon dioxide for use as either injection wells or production wells. A problem in providing such an injection or production well is that Portland cements are typically used to cement casings in such injection and production wells, and Portland type cements are susceptible to acid attack by dissolved carbon dioxide which forms carbonic acid. Portland cements contain calcium hydroxide, and calcium hydroxide reacts with carbonic acid. Particularly at elevated temperatures, continual influx of carbonic acid convert Portland cement to a soft amorphous gel through a variety of reactions. Portland cements therefore gradually degrade while exposed to carbon dioxide. The inherently high permeability of Portland cements also causes a large portion of the cement to be exposed to this carbonic acid attack.

Eventually, remedial squeeze cementing is required to repair degraded Portland cements, or the cement will fail. This is very undesirable due to the high cost of squeeze cementing, and the unlikelihood that a squeeze cement will result in the quality cement job that is required.

Cementing is particularly difficult when carbonic acid is present when the cement is to be set. Carbonic acid inhibits proper setting of Portland type cements. Expensive additives are therefore added to the cement slurry to enable the Portland cement slurries to set when the slurry must cure in the presence of carbonic acid. Permeability of Portland cements can also be reduced by inclusion of additives in the cement slurry and the use of higher density slurries, but these measures also increase the cost of the cement.

It would therefore be desirable to provide a method to cement wellbores in the presence of carbon dioxide or carbonic acid and a method to cement wellbores when the wellbores will subsequently be contacted with carbon dioxide or carbonic acid wherein the cement is not degraded by carbon dioxide or carbonic acid to the extent that Portland cements are degraded by carbon dioxide or carbonic acid.

It is therefore an object of the present invention to provide a method to cement wellbores in the presence of carbon dioxide or carbonic acid and where the wellbore will be exposed to carbon dioxide or carbonic acid after the cement cures wherein the cement has improved tolerance to carbon dioxide or carbonic acid and wherein the cement will cure in the presence of carbon dioxide or carbonic acid.

SUMMARY OF THE INVENTION

These and other objects are accomplished by a method to cement a portion of a wellbore in the presence of carbon dioxide comprising the steps of: providing a blast furnace slag based cement slurry; placing the blast furnace slag based slurry in the portion of the wellbore to be cemented in the presence of carbon dioxide; and allowing the blast furnace slag based cement to harden. The blast furnace slag cement slurry can further comprise activators such as sodium hydroxide and sodium carbonates.

Carbon dioxide is used herein to refer to both carbon dioxide and carbonic acid when carbon dioxide is dissolved in liquid water.

The blast furnace slag cement further comprises, in a preferred embodiment, an ionomer. The ionomer is a crosslinked acid functionalized polymer. The acid functionalized polymer is crosslinked by metal ions complexed with the acid functional groups. The metal ions could be additional metal oxide solids, or metal oxides present in the blast furnace slag could function as the crosslinking agent. The ionomer improves ductility of the set cement, and decreases permeability of the set cement. Decreasing permeability further improves resistance to degradation by carbon dioxide by reducing the exposure of cement to carbon dioxide.

The portion of the wellbore being cemented is preferably drilled using a drilling fluid that contains a cementitious material in order to form a settable filter cake. The cementitious material can be, for example, blast furnace slag or metal oxide solids. The metal oxide solids are solidified by contacting the metal oxide solids with acid functionalized polymers. The acid functionalized polymers for complexes with the metal oxide solids forming a solid that is very inert to carbon dioxide and relatively impermeable.

The method of the present invention can be used to cement casings in wellbores in either new installations or squeeze cement applications. The wellbore could be a production well in a carbon dioxide flood operation or a production well in a reservoir where moderate concentrations of dissolved carbon dioxide naturally occur. The method could also be useful in dissolved carbon dioxide injection wells.

DETAILED DESCRIPTION OF THE INVENTION

Placement of Cement Slurry

The methods of the present invention are useful in cementing wells exposed to any significant carbon dioxide although typically, an advantage over Portland cements will be realized with concentrations of carbon dioxide up to and including 100 mole percent. Influx of dissolved carbon dioxide into a water wet cement column will result in the formation of carbonic acid and the dissolution of Portland cement.

Placement of the blast furnace slag in the portion of the wellbore to be cemented is accomplished by means that are well known in the art of wellbore cementing. Cement is typically placed in a wellbore surrounding a casing to prevent vertical communication through the annulus between the casing and the wellbore or the casing and a larger casing. A cement slurry is typically place in a wellbore by circulation of the slurry down the inside of the casing, followed by a wiper plug and a nonsetting displacement fluid. The wiper plug is usually displaced to a collar, located near the bottom of the casing. The collar catches the wiper plug to prevent overdisplacement of the cement and also to minimize the amount of the cement left in the casing. The cement slurry is circulated up the annulus surrounding the casing, where it is allowed to harden. The annulus could be between the casing and a larger casing or could be between the casing and the borehole. Typically, the casing will be cemented up to the bottom of the next larger casing.

Squeeze cementing is accomplished by forcing cement slurry through perforations in the casing to the formation and wellbore surrounding the casing. Cement is placed in this manner, for example, when either the original cement fails, was not initially placed acceptably, or when the a producing interval is to be shut off.

In this description the term 'cementitious material' means either an hydraulic material which on contact with water and/or activators hardens or sets into a solidified composition or a component which, on contact with a reactive second component, sets or hardens into a solidified composition. Thus, broadly it can be viewed as a material which can chemically combine to form a cement. A slurry of the cementitious material and the component or components which cause it to harden is referred to herein as a cementitious slurry.

Drilling Fluids

Drilling fluid used to drill the wellbore can be either a conventional drilling fluid, i.e., one not containing a cementitious material, or it can be one already containing a cementitious material in a relatively small amount. The drilling fluid can be either a water-based fluid or an oil-based fluid. The term 'water-based fluid' is intended to encompass both fresh water muds, salt water containing muds, whether made from seawater or brine, and other muds having water as the continuous phase including oil-in-water emulsions. In any event drilling fluid will always contain at least one additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

It is generally preferred that the water-based drilling fluids use water containing dissolved salts, particularly sodium chloride. In these instances, 0.1 to saturation, and preferably 3 to 10 wt % sodium chloride may be used. In some instances, a saturated solution under the conditions being employed can be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KBr, KCl, $CaCl_2$, $NaNO_3$, $KNO_3$, $NaC_2H_3O_2$, $KC_2H_3O_2$, $NaCHO_2$ and $KCHO_2$ among which sodium chloride is preferred, as noted above. The term 'oil-based fluids' is meant to cover fluids having oil as the continuous phase, including low water content oil-base mud and invert oil-emulsion mud.

A typical mud formulation to which cementitious material may be added to form drilling fluid is as follows: 10–20 wt % salt, 8–10 lbs/bbl bentonite, 4–6 lbs/bbl carboxymethylated starch (fluid loss preventor), sold under the trade name "BIOLOSE" by Milpark, 0.5–1 lbs/bbl partially hydrolyzed polyacrylamide (PHPA) which is a shale stabilizer, sold under the trade name "NEWDRIL" by Milpark, 1–1.25 lbs/bbl CMC sold under the trade name "MILPAC" by Milpark, 30–70 lbs/bbl drill solids, and 0–500 lbs/bbl barite.

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

When universal fluid is used to drill a well which is then cemented according to the present invention includes the steps of: preparing a universal fluid by mixing a drilling fluid and a cementitious material; drilling a borehole with the universal fluid and laying down a settable filter cake on the walls of the borehole during drilling of the well; diluting the drilling fluid; adding additional cementitious material and/or accelerators (or reactive second components) and introducing the thusformed cementitious slurry into the wellbore and into an annulus between the wellbore and a casing where it hardens and sets up forming a good bond with the filter cake which filter cake, with time, actually hardens itself because of the presence of cementitious material therein. These steps may be performed with carbon dioxide present in the formation surrounding the wellbore, or the set cement can later be exposed to carbon dioxide and/or carbonic acid. In either case, the resulting cement will provide a significant improvement in strength compared to Portland type cements. Hardening is facilitated by any accelerators which may be present in the cementitious slurry and which migrate by diffusion and/or filtration into the filter cake.

Cementitious Components

The cementitious component can be blast furnace slag, or a mixture of blast furnace slag and the metal compound used to produce an ionomer. The preferred cementitious material is blast furnace slag. By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference. By 'phosphorus salt' is meant a phosphonate, a phosphate or a polyphosphate as is described in detail hereinafter. The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 500 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Maryland.

A usual blast furnace slag composition range in weight percent is: $SiO_2$, 30-40; $Al_2O_3$, 8-18; CaO, 35-50; MgO, 0-15; iron oxides, 0-1; S, 0-2 and manganese oxides, 0-2. A typical specific example is: $SiO_2$, 36.4; $Al_2O_3$, 16.0; CaO, 43.3; MgO, 3.5; iron oxides, 0.3; S, 0.5; and manganese oxides <0.1.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$ Blaine specific surface area. Corresponding to 16 to 31 microns in size; "microfine" can be used to describe those particles in the 7,000 to 10,000 $cm^2/g$ Blaine specific surface area range that correspond to particles of 5.5–16 microns in size and "ultrafine" can be used to describe particles over 10,000 $cm^2/g$ Blaine specific surface area that correspond to particles 5.5 microns and smaller in size. Small particle size blast furnace slag is available from Geochem under the trade name "MICROFINE MC 100", and Koch Minerals, Wichita, Kansas, under the trade name "WELL-CEM". The Koch material has a Blaine specific surface area of about 10,040 $cm^2/g$.

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 8 wt % can be ground to the ultrafine particle size and the remainder ground in a normal way thus giving particles generally in a size range of greater than 11 microns, the majority being in the 11 to 31 micron range.

By ionomer is meant organometal compositions having a metal attached to or interlocking (crosslinking) a polymer chain. Suitable polymer components of such ionomers can be represented by the formula

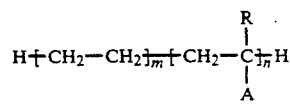

wherein A is

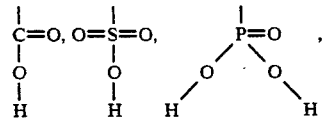

or a mixture of

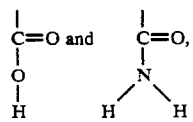

and wherein R is H or a 1-10 carbon atom alkyl radical. The ratio of m to n is generally within the range of 0:1 to 100:1, preferably 0.1:1 to 10:1.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One such polymer is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 500 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000-15,000,000 molecular weight are suitable. The copolymers will generally have from 2-99, preferably 5-80, more preferably 10-60 mole percent acid-containing units.

The poly(carboxylic acid) component can be any water soluble or water dispersable carboxylic acid polymer which will form ionomers. Ionomer forming polymers are well known in the art. Suitable polymers include poly(acrylic acid) poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

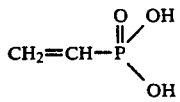

Suitable copolymers containing vinyl phosphonic acid include vinyl phosphonic acid/acrylic acid copolymer as well as copolymers with other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

One way to slow down the formation of the ionomer on contact with the metal source is to utilize a polymer with ester linkages which will hydrolyze with time in the aqueous cementitious slurry to give more reactive sites. Up to 100 percent of the functional groups can be ester groups depending on the degree to which it is desired to inhibit the setting.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as CaO, MgO or ZnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity at least 3.0, preferably 3.5. By 'insoluble' is meant that less than 0.01 parts by weight dissolve in 100 parts by weight of cold (room temperature) water.

The particle size of the metal compound component can vary widely. Generally, it will be within the range such that the powder exhibits a surface area within the range of 500 cm$^2$/g to 30,000 cm$^2$/g, preferably 1,500 cm$^2$/g to 25,000 cm$^2$/g, most preferably 2,000 cm$^2$/g to 20,000 cm$^2$/g, all as Blaine specific surface areas.

The amount of polymer utilized will vary widely depending upon the carboxylic acid content of the polymer; broadly, 10 to 200, preferably 10 to 100, most preferably 10 to 80 wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

The total amount of cementitious material in the cementitious slurry will typically range from about 20 lbs/bbl to about 600 lbs/bbl, preferably 50 lbs/bbl to 500 lbs/bbl, most preferably between 100 lbs/bbl and 350 lbs/bbl.

With the ionomers when made with a polyvalent metal compound, a crosslinked network structure exists as a result of the addition of the second component, thus giving a very strong solid cement.

Because of the mass provided by the metal compound component of the ionomer, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as barium sulfate or barite. They offer a further advantage in that they do not set up until the second component is added.

The metal compound of the ionomer can be used as the sole cementitious material or can be used in admixture with siliceous hydraulic materials such as the blast furnace slag. In one embodiment an hydraulic component such as slag can be used to give the metal ion component of the ionomer to give, in effect, a mixture formed in situ.

Preferably, when the ionomer is utilized, the metal compound is added first and thereafter at such time as it is desired for the cement to be activated to set, the acid functionalized polymer is added. In the case of the universal fluids, a portion of the total metal compound can be added to the drilling fluid, the remainder being added after dilution when the cementitious slurry is being formed.

The sequence for the universal fluid embodiment of this invention is to prepare the drilling fluid containing a portion of the total slag or metal compound to be utilized, carry out the drilling operation, dilute the fluid, add the remainder of the slag or metal compound, and thereafter add the activator or acid components to form a cement slurry, place the cement slurry in a portion of the wellbore to be cemented and allowing the slurry to harden. This process may be performed either with the cement slurry exposed to carbon dioxide during placement and/or the set cement exposed to carbon dioxide.

In accordance with the invention that utilizes universal fluid, the fluid itself becomes a part of the final cement and thus, this portion of the drilling fluid does not need to be disposed.

The ionomer embodiments of this invention are of particular value for filling and sealing the annulus between a borehole wall and a casing, or between casings, where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. For similar reasons the ionomer embodiment of the invention is beneficial in cementing liners and tieback casing strings which may otherwise leak due to changes in pressure and temperature in the well during production operations. Another area where the ductility of the ionomer cement is of special value is in slim hole wells where the annulus is smaller. Still yet another area where this ductility is important is in extended reach drilling.

In some instances, it may be desirable to use a material which functions as a retarder along with the activator because of the need for other effects brought about by the retarder For instance, a chromium lignosulfonate may be used as a thinner along with the activator even though it also functions as a retarder. Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, a naphthalene sulfonate, dodecylbenzene sulfonate, and mixtures thereof.

In one embodiment the drilling fluid consists essentially of slag and seawater and is pumped exclusively using the piping and pumps associated with the drilling rig without the need for any pumps designed for pumping cement.

In the case of hydraulic materials, particularly the preferred hydraulic material, blast furnace slag, the amount of hydraulic material present in the universal fluid is generally within the range of 1 to 100 lbs/bbl of final drilling fluid, preferably 10 to 80 lbs/bbl, most preferably 20 to 50 lbs/bbl. In the case of the organo-metals (ionomers) the amount of metal compound initially present in universal fluid can also vary widely. Generally, 1 to 500 lbs/bbl, preferably 50 to 300 lbs/bbl, most preferably 100 to 250 lbs/bbl of the metal compound are used.

The total amount of cementitious material in the cementitious slurry will typically range from about 20 lbs/bbl to about 600 lbs/bbl, preferably 100 lbs/bbl to 500 lbs/bbl, most preferably 150 lbs/bbl to 350 lbs/bbl. This can be adjusted to give the desired density as noted hereinabove.

Reference herein to additives encompasses both the specialized additives necessary for this invention such as the carboxylic acid polymer in the case of the ionomer as well as conventional additives.

Mixed Metal Hydroxides

Mixed metal hydroxides can be used in the drilling fluid to impart thixotropic properties. The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1-20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 1.5 lbs/bbl, most preferably 0.7 to 1.2 lbs/bbl. Mixed metal hydroxides are known in the art and are trivalent metal hydroxide-containing compositions such as MgAl(OH)4.7Cl0.3. A description of mixed metal hydroxides can be found in Burba, U.S. Pat. No. 4,664,843 (May 12, 1987), which is incorporated herein by reference. The mixed metal hydroxides in the drilling fluid, in combination with blast furnace slag, tend to set to a cement having considerable strength in a comparatively short time, i.e., about one-half hour at temperatures as low as 100° F. This can be a major asset in some applications.

Drilling Fluid Additives

Suitable fluid loss additives found in drilling fluids include bentonite clay, carboxymethylatel starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

It is particularly desirable in accordance with a further embodiment of this invention to utilize silica to increase the temperature resistance of the final cement. The use of blast furnace slag as the hydraulic component, in itself, allows greater latitude in the temperature which can be tolerated, because the blast furnace slag is inherently less thermally sensitive than other known hydraulic components such as Portland cement and thus can be hardened over a wider range of temperatures without resort to additives. This is of particular advantage where there is a substantial temperature gradient from the top to the bottom of a borehole section to be cemented. However, with the addition of silica, further temperature resistance may be imparted to the cement after it is set. Thus, with blast furnace slag and silica a temperature resistant cement is possible and with other cementitious components the temperature range can be extended through the used silica. Suitable silicas include crystalline silicas such as alpha quartz.

Universal Fluids

In another embodiment of this invention, most or all of the components of the drilling fluid are chosen such that they have a function in the cementitious material also. The following Table illustrates the uniqueness of such formulations.

TABLE A

| | Function | | | |
| --- | --- | --- | --- | --- |
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |

TABLE A-continued

| | Function | | | |
|---|---|---|---|---|
| | Drilling Fluid | | Cementitious Slurry | |
| Additive | Primary | Secondary | Primary | Secondary |
| Biopolymer[3] | Viscosity | — | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density concentration | Solids |
| Bentonite[6] | Fluid loss control | — | Fluid loss control | Solids concentr. |
| Clay/Quartz dust | — | — | Solids concentration | — |
| Metal Compound[8] | Weight | Solids | Cement component | Solids |
| Functional Group Polymer | Not Present | Not Present | Cement component | — |
| Lime[9] | Cuttings/Wellbore stabilizer | Alkalinity | Accelerator concentration | Solids |
| PECP[10] | Shale stabilizer | Fluid loss | Retarder | Rheological Control |
| NaCl | Shale stabilizer | — | — | — |

[1]Polydrill, A synthetic polymer manufactured by SKW Chemicals Inc. under trade name Polydrill, for instance
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under the trade name "MOR-REX".
[5]Barite is $BaSO_4$, a drilling fluid weighting agent.
[6]Bentonite is clay or colloidal clay thickening agent.
[7]Clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]CaO
[10]Polycyclicpolyetherpolyol The material in the above Table A labeled PECP is of special significance in connection with this invention. This refers to a polyhydric alcohol most preferably a polycyclicpolyetherpolyol. A general chemical composition formula representative of one class of these materials is as follows:

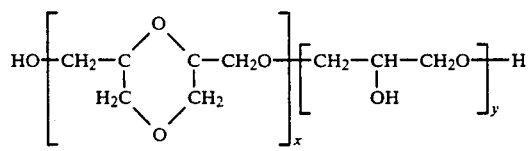

A more complete description of these polycyclicpolyetherpolyols is found in the Hale and Cowan patent, U.S. Pat. No. 5,058,679 (Oct. 22, 1991), referred to hereinabove, the disclosure of which is incorporated herein by reference.

Universal drilling fluids which utilize blast furnace slag can be subsequently activated to cause the drilling fluid to develop compressive strength with time.

Blast Furnace Slag Activators

Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

A combination of sodium hydroxide and sodium carbonate as an activator for hardening blast furnace slag. In addition, blast furnace slag can be added between the use of this material as a drilling fluid and its use as a cement. The additional slag can be the activator, especially if heat is imparted to the operation. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe are dramatically reduced with PECP in the drilling fluid. PECP also acts as a modifier of rheology because of a tendency to adsorb onto polymer and clay solid surfaces.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and (2), whole mud that has not been removed from washed-out sections of the hole during displacement will harden with time and, therefore, provide an effective sealant and lateral support to the casing.

In areas such as slim hole drilling, the ionomer universal fluid gives the process benefit of avoiding the removal of an incompatible drilling mud and the product benefit of being resistant to deflection when set.

In the case of the universal fluids, the amount of cementitious material can vary considerably and also can vary depending upon whether the cementitious component is a siliceous material or ionomer.

Filter Cake Setting

In yet another embodiment of this invention the drilling process is carried as described hereinabove with a universal fluid to produce a borehole through a plurality of strata thus laying down a filter cake. Prior to the cementing operation the activator or reactive second component is passed into contact with the filter cake, for instance by circulating the activator or reactive second component down the drill string and up the annulus between the drill string and the filter cake. This can be accomplished by circulating a separate fluid containing the activator or reactive second component or by adding an activator or reactive second component to the drilling fluid. Alternatively, the drill string is removed and the casing inserted and the activator or reactive second component circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drilling fluid is then diluted, the drill string removed, and the cementing carried out as described hereinabove.

Conventional spacers may be used in the above described sequence. Also, any left over fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate when the universal fluid contains slag, or a polymer with a functional group such as a carboxy as described hereinabove wherein the universal fluid contains a metal compound proton acceptor.

In another embodiment of this invention, the drilling is done using a drilling fluid containing a metal compound to lay down a filter cake which is preferably set by circulating a polymer as described to produce an ionomer. Thereafter, the cementing is done with a cementitious slurry comprising blast furnace slag and preferably an accelerator. Also, the use of blast furnace slag as described above for the metal compound source of an ionomer can be used in this embodiment as well. Thus, ionomers can be formed as filter cake followed by cementing with blast furnace slag.

Puddling

Another area where the cementitious slurries of this invention find special applicability is in what is known as puddling. In accordance with this embodiment of the invention, the cementitious slurry is placed in the wellbore prior to inserting the casing into the wellbore. Placing the cementitious slurry into the wellbore prior to inserting the casing eliminates difficulty in displacing drilling fluids with cementitious slurry in portions of the borehole where the casing is poorly centralized. When the casing is poorly centralized, it is difficult to get the cement slurry in the narrow portion of the annulus. This results in a vertical channel that allows communication up the wellbore after the cement sets by placing the cement slurry into the wellbore prior to inserting the casing; these vertical channels will therefore be avoided even if the casing is poorly centralized. The use of blast furnace slag-based cement slurry facilitates the use of this procedure because setting of the blast furnace slag-based slurries can be retarded so that the casing can be inserted into the slurry and yet still form a strong cement within a reasonable time.

Bonding Surfactants

Surfactants, alcohols, or blends thereof may be used in the drilling fluids of this invention to improve bonding. The surfactants may be anionic, amphoteric, cationic, nonionic or blends thereof, e.g., nonionics with anionic or cationic surfactants.

The following surfactants, classes of surfactants, and mixtures of surfactants are particularly useful in the present invention:

Alkanol amides (nonionic);
Ethoxylated alkyl aryl sulfonate;
Amine oxides (nonionic);
Betaines and Betaine Derivatives;
Ethoxylated Alcohols (nonionic);
Sulfates and Sulfonates of Ethoxylated Alcohols (anionic);
Ethoxylated Alkyl Phenols (nonionic);
Sulfates or Sulfonates of Ethoxylated Alkyl Phenols (and their salts) (anionic);
Fluorocarbon-based Surfactants (nonionic, amphoteric, anionic);
Phosphate Derivatives of Ethoxylated Alcohols;
Quaternary Ammonium Chloride (cationic);
Sulfates or Sulfonates of Alcohols (and their salts)(anionic); and
Condensation Products of Ethylene Oxide and Propylene Glycol (nonionic).

The surfactants or mixtures of surfactants should be soluble in the cementitious slurry and not precipitate or otherwise degrade under the action of the ions in the cementitious slurry (e.g., resistant to calcium and other electrolytes) and the temperature and pressure conditions occurring during the placement and curing of the cement.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$-$C_{15}$ linear alcohol ethoxylate sulfate, $C_9$-$C_{11}$ linear alcohol ethoxylate sulfates, sodium lauryl sulfate, and ethoxy alcohol sulfates The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

The invention is very effective for solidification of drilling fluids containing polyhydric alcohols. The following alcohols may be used alone or in blends with the preceding surfactants. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclic-dietherdiols are preferred and polycyclicpolyetherpolyols (referred to hereinabove as PECP) are most preferred. "Poly" is used to mean two or more.

The alcohols or mixtures of alcohols useful in this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act to both lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase when used in the preparation of the drilling fluid of this invention will generally be at least about 2% by weight and preferably from about 2 to about 30% by weight based on the water phase and more preferable from about 5 to about 15% by weight; excellent results have been obtained with concentrations between about 10 and about 20% by weight. Preferably at least about 1% wt of the alcohol is cyclicetherpolyol or acyclic polyol, based on the total weight of the alcohol.

We claim:

1. A method to cement a portion of a wellbore in the presence of carbon dioxide comprising the steps of:
   providing granulated water-quenched a blast furnace slag based cement slurry;
   placing granulated water-quenched the blast furnace slag based slurry in the portion of the wellbore to be cemented in the presence of carbon dioxide; and
   allowing the granulated water-quenched blast furnace slag based cement to harden.

2. The method of claim 1 wherein the blast furnace slag based cement slurry comprises blast furnace slag having a particle size of 500 to 15,000 $cm^2/g$ Blaine specific surface area.

3. The method of claim 2 wherein the blast furnace slag based cement slurry further comprises an activator.

4. The method of claim 2 wherein the blast furnace slag based cement slurry comprises an acid functionalized polymer crosslinked by metal oxides.

5. The method of claim I further comprising the step of drilling the portion of the wellbore using a drilling fluid comprising a cementitious material.

6. The method of claim 5 wherein the cementitious material is blast furnace slag.

7. The method of claim 5 wherein the blast furnace slag cement slurry is prepared by adding blast furnace slag to at least a portion of the drilling fluid.

8. The method of claim 1 wherein the wellbore is a carbon dioxide injection well.

9. The method of claim 1 wherein the wellbore is a production well wellbore.

10. A method to cement a portion of a wellbore in the presence of carbon dioxide comprising the steps of:
    providing granulated water-quenched a blast furnace slag based cement slurry;
    placing the granulated water-quenched blast furnace slag based slurry in the portion of the wellbore to be cemented;
    allowing the granulated water-quenched blast furnace slag based cement to harden; and
    exposing the set cement to carbon dioxide.

11. The method of claim 10 wherein the blast furnace slag based cement slurry comprises blast furnace slag having a particle size of 500 to 15,000 $cm^2/g$ Blaine specific surface area.

12. The method of claim 11 wherein the blast furnace slag based cement slurry further comprises an activator.

13. The method of claim 11 wherein the blast furnace slag based cement slurry comprises an acid functionalized polymer crosslinked by metal oxides.

14. The method of claim 10 further comprising the step of drilling the portion of the wellbore using a drilling fluid comprising a cementitious material.

15. The method of claim 14 wherein the cementitious material is blast furnace slag.

16. The method of claim 14 wherein the blast furnace slag cement slurry is prepared by adding blast furnace slag to at least a portion of the drilling fluid.

17. The method of claim 10 wherein the wellbore is a carbon dioxide injection well.

18. The method of claim 10 wherein the wellbore is a production well wellbore.

* * * * *